J. MUTH & C. F. HEINKEL.
WIRELESS TRANSMITTING SYSTEM.
APPLICATION FILED SEPT. 25, 1908.
953,635.
Patented Mar. 29, 1910.
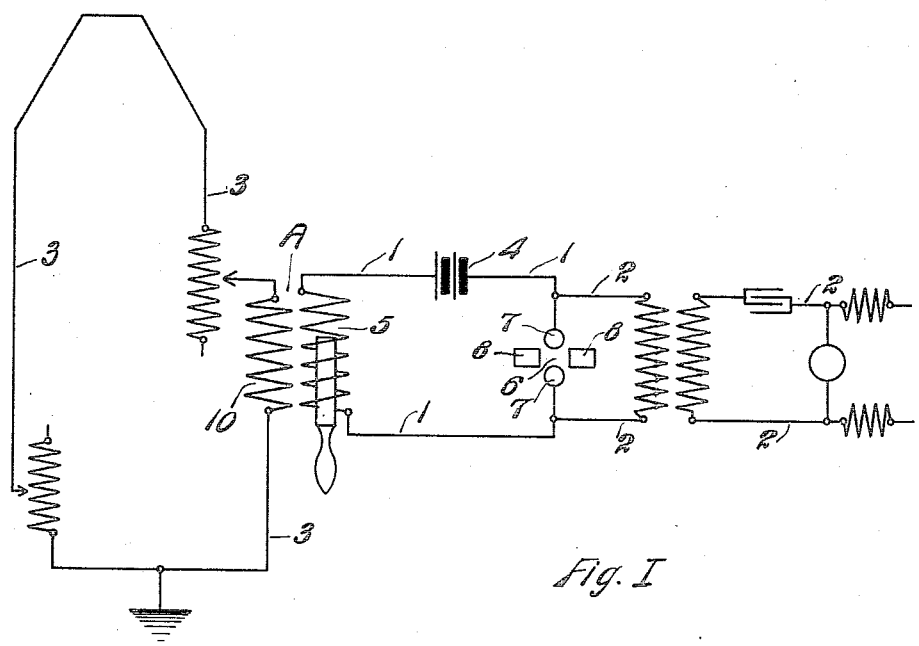
Fig. I.
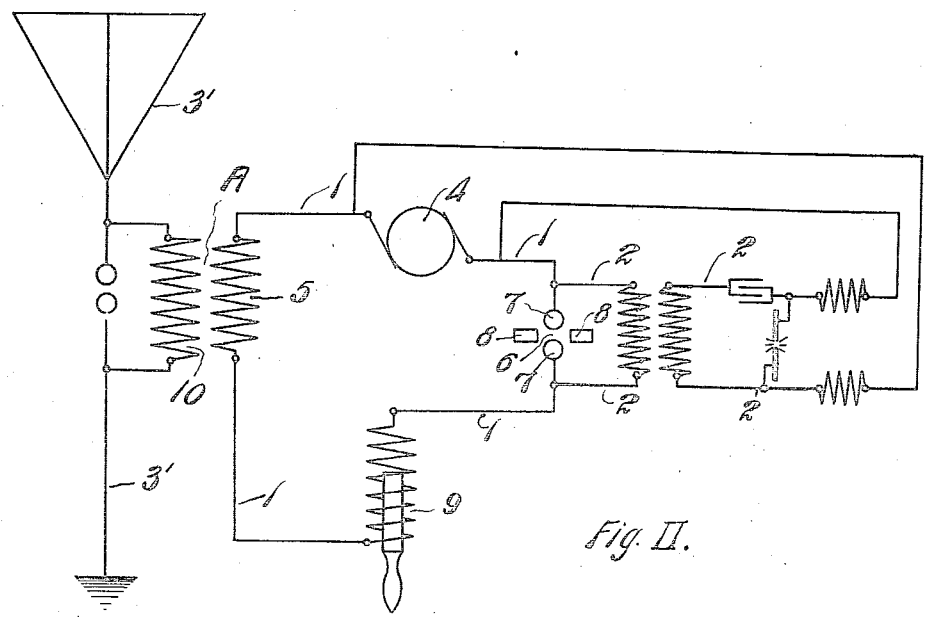
Fig. II.
Witnesses:
Henry R. Lydow.
Frank S Smith
Inventors:
John Muth.
Christian F. Heinkel.

UNITED STATES PATENT OFFICE.

JOHN MUTH AND CHRISTIAN F. HEINKEL, OF CLEVELAND, OHIO.

WIRELESS TRANSMITTING SYSTEM.

953,635.  Specification of Letters Patent.  Patented Mar. 29, 1910.

Application filed September 25, 1908. Serial No. 454,823.

*To all whom it may concern:*

Be it known that we, JOHN MUTH and CHRISTIAN F. HEINKEL, citizens of the United States, both residing at Cleveland, in the county of Cuyahoga and State of Ohio, have invented a new and useful Wireless Transmitting System, of which the following is a specification.

Our invention relates to systems for developing and transmitting electro-magnetic waves.

The object of our invention is a novel circuit arrangement whereby more powerful electro-magnetic waves can be developed and transmitted, and whereby the efficiency of such electro-magnetic wave development and transmission is increased.

We attain our object by adding a power-circuit to any wireless transmission apparatus or system.

It is well known in the art that persistent oscillations and high power are the principal components to overcome long distance; the apparatus or system of the prior art possesses persistent oscillations, but sufficient power to overcome long distance has not been obtained; we therefore, in this application, describe and show a new and novel circuit arrangement, in which a power-source is coöperatively connected with the oscillator-circuit and with the radiator-circuit; said oscillator-circuit, as heretofore employed, furnished the oscillations as well as the power, and, inasmuch as the methods and apparatuses employed to produce said oscillations will not permit of high power, long distance transmission, as for instance in telephony, has not been accomplished; we therefore employ said oscillator-circuit for the purpose of producing oscillations only, and coöperatively connect a power-source with said oscillator-circuit and with said radiator-circuit; it will be seen that, by this arrangement, said power-source does not operate the oscillation apparatus with its full energy or power, and therefore is not limited thereby, and that any amount of power may be supplied to the system without regard to the oscillation apparatus.

Having thus set forth in general the principles upon which our improvement depends and the advantage we have over the prior art, we shall now particularly describe two simple embodiments thereof which we have shown diagrammatically in the drawings for the purpose of more fully disclosing our invention; but it is to be understood that such diagrams show only two of the numerous possible embodiments of our invention, and that we do not limit ourselves thereto inasmuch as many modifications may be devised by those skilled in the art without departing from the spirit and intent of our invention.

In the drawings: Figure I represents the circuit arrangement in connection with a loop antenna, and Fig. II represents the circuit arrangement in connection with a linear antenna.

1 is the power-circuit, 2 is the oscillator-circuit, and 3 and 3' are the antennæ; in power-circuit 1 is inserted a source of power 4 which may be a battery, a direct or alternating current generator, or any other source of power, which may be required and which source of power is preferably constructed and arranged so that it may be regulated or adjusted to suit the distance to be overcome; with such construction and arrangement the efficiency of the system is increased inasmuch as only the necessary amount of power to overcome a desired distance needs to be used and further, such construction and arrangement is very useful and advantageous, particularly when used in connection with a wave-deflector, in sending electro-magnetic waves to a desired station; in power-circuit 1 is further inserted the primary 5 of a transformer A, an air-gap 6 which preferably is adjustable, spark-balls 7, a suitable blow-out 8, as for instance a magnetic blow-out, or a pneumatic blow-out, or an oil blow-out, or a gas blow-out, and a variable inductance 9 which is for the purpose of preventing the energy from oscillator-circuit 2 from passing through source of power 4, and which may be placed as shown in Fig. II or which may be placed in primary 5 as shown in Fig. I.

In oscillator-circuit 2 we show a plain circle which represents an apparatus for producing oscillations; said apparatus may be the singing arc method, or a Tesla-transformer, or any other method of producing oscillations.

Antenna may be a loop antenna as shown in Fig. I, or an open end antenna as shown in Fig. II, with or without a ground wire, or may be any other kind of antenna.

The secondary 10 of transformer A is inserted into radiator-circuit.

Oscillator-circuit 2 may be supplied with power from power-source 4 by means of a shunt as shown in Fig. II, or from a separate source of power, not shown in the drawings.

The operation of this system is as follows: The oscillator-circuit 2, when in operation, will develop oscillations which will cause a succession of sparks to jump across air-gap 6, the energy from power-source 4 will follow such sparks, thus opening and closing power-circuit 1, and will act through primary 5; such action will be impressed upon secondary 10 and upon the antenna; it is well known in the art that a current will follow a path made by another current however small; thus it will be seen that in our system the oscillator-circuit develops the oscillations and the power-circuit develops the power, and that our arrangement can be applied to any wireless system by the addition of our power-circuit; with this system we can develop and transmit electromagnetic waves of any shape, either long or short, regular or irregular, of any frequency, persistent or otherwise, and of any power desired, such desire being limited only by power-source; the systems of the prior art employ no power-circuit as we do, but depend upon the charge and discharge of condensers, and for that reason long distance transmission, for instance in telephony, was not a success.

Among the advantages of this invention may be mentioned that, inasmuch as we employ a power-circuit, we are able to develop and transmit more powerful electro-magnetic waves, thus overcoming longer distance, and doing so more efficiently.

This invention can be used in wireless telegraphy, wireless telephony, wireless power transmission, X ray, and other processes which are dependent for their operation upon disturbances in the ether.

While we have shown our invention embodied in certain apparatus, it is not to be inferred that such apparatus represents the only forms in which our invention may be embodied, but are illustrated and described only as illustrative of arrangement, to make clear the principle of application of our invention.

We have nothing new in either oscillator or antenna, and do not particularly claim either one or the other in this application, but we do have and claim a power-circuit coöperatively connected with any wireless system, which is new.

Having thus described our invention we claim and desire to secure by Letters Patent:

1. A system of wireless transmission of electro-magnetic waves having a source of power conductively connected to the oscillator-circuit and inductively connected with the radiator-circuit.

2. A system of wireless transmission of electro-magnetic waves consisting of a power-circuit into which is inserted a source of power, an air-gap and the primary of a transformer, of an oscillator-circuit which opens and closes said power-circuit at said air-gap and which may be supplied with energy from any source of power, and of a radiator-circuit into which is inserted the secondary of said transformer.

3. In a system of wireless transmission of electro-magnetic waves the combination of a power-circuit into which is inserted a source of power, an air-gap and the primary of a transformer, of an oscillator-circuit which opens and closes said power-circuit at said air-gap, and of a radiator-circuit into which is inserted the secondary of said transformer.

4. In a system of wireless transmission of electro-magnetic waves the combination of a power-circuit into which is inserted a source of power, an air-gap and the primary of a transformer, of an oscillator-circuit which opens and closes said power-circuit at said air-gap, of a radiator-circuit into which is inserted the secondary of said transformer, and of a blow-out at said air-gap.

5. In a system of wireless transmission of electro-magnetic waves the combination of a power-circuit into which is inserted a source of power, an air-gap and the primary of a transformer, of an oscillator-circuit which opens and closes said power-circuit at said air-gap, of a radiator-circuit into which is inserted the secondary of said transformer, of a blow-out at said air-gap, and of a variable inductance in said power-circuit.

In testimony whereof we have signed our names to this specification in the presence of two subscribing witnesses.

JOHN MUTH.
CHRISTIAN F. HEINKEL.

Witnesses:
HENRY R. SYDOW,
FRANK S. SMITH.